(12) United States Patent
Hartleip et al.

(10) Patent No.: US 9,150,067 B2
(45) Date of Patent: Oct. 6, 2015

(54) UNDERBED SUPPORT ASSEMBLY FOR FIFTH WHEEL AND GOOSENECK HITCH SYSTEMS

(71) Applicants: Carolyn R Hartleip, Brighton, MI (US); Jagan M Mummadi, Novi, MI (US); James B Legray, Lake Orion, MI (US); Bryan G Mrozinski, Saginaw, MI (US)

(72) Inventors: Carolyn R Hartleip, Brighton, MI (US); Jagan M Mummadi, Novi, MI (US); James B Legray, Lake Orion, MI (US); Bryan G Mrozinski, Saginaw, MI (US)

(73) Assignee: FCA US LLC, Auburn Hills, MI (US)

( * ) Notice: Subject to any disclaimer, the term of this patent is extended or adjusted under 35 U.S.C. 154(b) by 97 days.

(21) Appl. No.: 14/050,836

(22) Filed: Oct. 10, 2013

(65) Prior Publication Data
US 2015/0102584 A1    Apr. 16, 2015

(51) Int. Cl.
*B60D 1/48* (2006.01)
*B60D 1/06* (2006.01)
*B60D 1/01* (2006.01)

(52) U.S. Cl.
CPC  *B60D 1/48* (2013.01); *B60D 1/015* (2013.01); *B60D 1/065* (2013.01)

(58) Field of Classification Search
CPC ........ B60D 1/485; B60D 1/488; B60D 1/015; B60D 1/065; B62D 53/061
USPC ..................... 280/415.1, 416.1, 417.1, 491.5, 280/124.128, 495, 503, 901
See application file for complete search history.

(56) References Cited

U.S. PATENT DOCUMENTS

| | | | | |
|---|---|---|---|---|
| 3,117,772 | A * | 1/1964 | Brown | 267/269 |
| 3,580,611 | A * | 5/1971 | McNitt | 280/433 |
| 6,065,766 | A * | 5/2000 | Pulliam | 280/415.1 |
| 6,409,202 | B1 | 6/2002 | Putnam | |
| 6,467,791 | B1 | 10/2002 | Fandrich et al. | |
| 6,502,846 | B2 | 1/2003 | Fandrich et al. | |
| 6,520,528 | B2 | 2/2003 | Fandrich et al. | |
| 7,416,204 | B2 * | 8/2008 | Hicks et al. | 280/433 |
| 7,793,968 | B1 | 9/2010 | Withers | |
| 7,828,317 | B2 | 11/2010 | Withers et al. | |
| 8,360,458 | B2 | 1/2013 | Stanifer et al. | |
| 2006/0208445 | A1 * | 9/2006 | Gideon | 280/124.116 |
| 2010/0109285 | A1 | 5/2010 | Stanifer et al. | |
| 2012/0031940 | A1 | 2/2012 | Leech et al. | |
| 2012/0145851 | A1 | 6/2012 | McCoy | |
| 2014/0339791 | A1 * | 11/2014 | McCall et al. | 280/491.5 |

FOREIGN PATENT DOCUMENTS

WO    2012078851    6/2012

* cited by examiner

*Primary Examiner* — Anne Marie Boehler
(74) *Attorney, Agent, or Firm* — Ralph E. Smith

(57) ABSTRACT

An apparatus for attaching either a gooseneck trailer hitch or a fifth wheel trailer hitch to a truck bed can include a single cross-member, a gooseneck ball receiver and a plurality of mounting pads. The single cross-member can be attached to first and second truck longitudinal frame rails. The gooseneck ball receiver can be coupled to the single cross-member and aligned with a gooseneck hitch opening in the truck bed. The plurality of mounting pads can be spaced apart from the single cross-member and can be attached to the frame rails independent of the single cross-member. The plurality of mounting pads can be aligned with a corresponding plurality of access openings in the truck bed. The single cross-member can be a suspension cross-member supporting at least first and second suspension members.

18 Claims, 7 Drawing Sheets

400;
UNDERBED SUPPORT ASSEMBLY FOR FIFTH WHEEL AND GOOSENECK HITCH SYSTEMS

FIELD

The present disclosure relates generally to a towing apparatus for a vehicle and, more particularly, to an underbed hitch mounting assembly for the vehicle.

BACKGROUND

It is generally known in the towing industry to utilize a fifth wheel hitch or a gooseneck hitch to secure a trailer to a bed of a towing vehicle, such as a pickup truck. Underbed systems have been developed to accommodate either a fifth wheel hitch system or a gooseneck hitch system. Such systems, however, typically cannot accommodate both the fifth wheel hitch and the gooseneck hitch without requiring a labor intensive conversion process. These underbed systems can also require the addition of multiple cross-car structural support members, which can present packaging challenges with other competing vehicle driveline and suspension systems. Thus, there remains a need for improvement in the relevant art.

SUMMARY

In one form, an apparatus for attaching either a gooseneck trailer hitch or a fifth wheel trailer hitch to a truck bed is provided in accordance with the teachings of the present disclosure. The apparatus can include a single cross-member, a gooseneck ball receiver and a plurality of mounting pads. The single cross-member can be attached to first and second truck longitudinal frame rails. The gooseneck ball receiver can be coupled to the single cross-member and aligned with a gooseneck hitch opening in the truck bed. The plurality of mounting pads can be spaced apart from the single cross-member and can be attached to the frame rails independent of the single cross-member. The plurality of mounting pads can be aligned with a corresponding plurality of access openings in the truck bed. The single cross-member can be a suspension cross-member supporting at least first and second suspension members.

In another form, an apparatus for attaching either a gooseneck trailer hitch or a fifth wheel trailer hitch to a truck bed is provided in accordance with the teachings of the present disclosure. The apparatus can include a single cross-member, a gooseneck ball receiver and first and second pairs of mounting pads. The single cross-member can be attached to first and second truck longitudinal frame rails, and can support first and second suspension components. The gooseneck ball receiver can be coupled to the single cross-member and can be aligned with a gooseneck hitch opening in the truck bed. The first and second pairs of mounting pads can be spaced apart from the single cross-member and can be attached to the respective first and second frame rails independent of the single cross-member and each other. The first and second pairs of mounting pads can be aligned with corresponding first and second pairs of access openings in the truck bed. A first mounting bracket can be associated with one of the first pair of mounting pads and a second mounting bracket can be associated with one of the second pair of mounting pads and can support respective third and fourth shock members.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
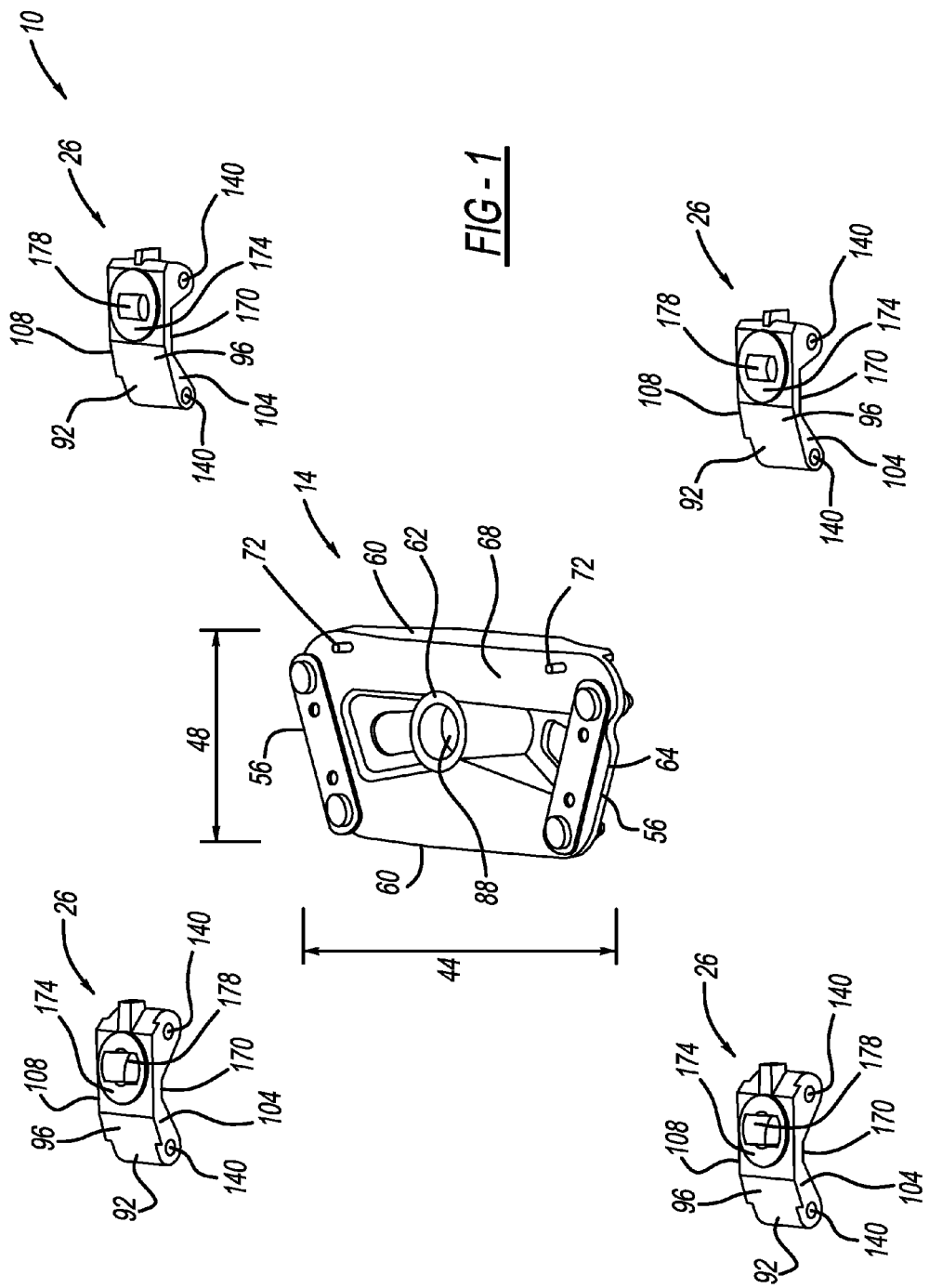
FIG. 1 is a perspective view of components of an exemplary underbed support structure assembly for accommodating either a fifth wheel trailer hitch or a gooseneck trailer hitch according to the principles of the present disclosure.
Figure 2:
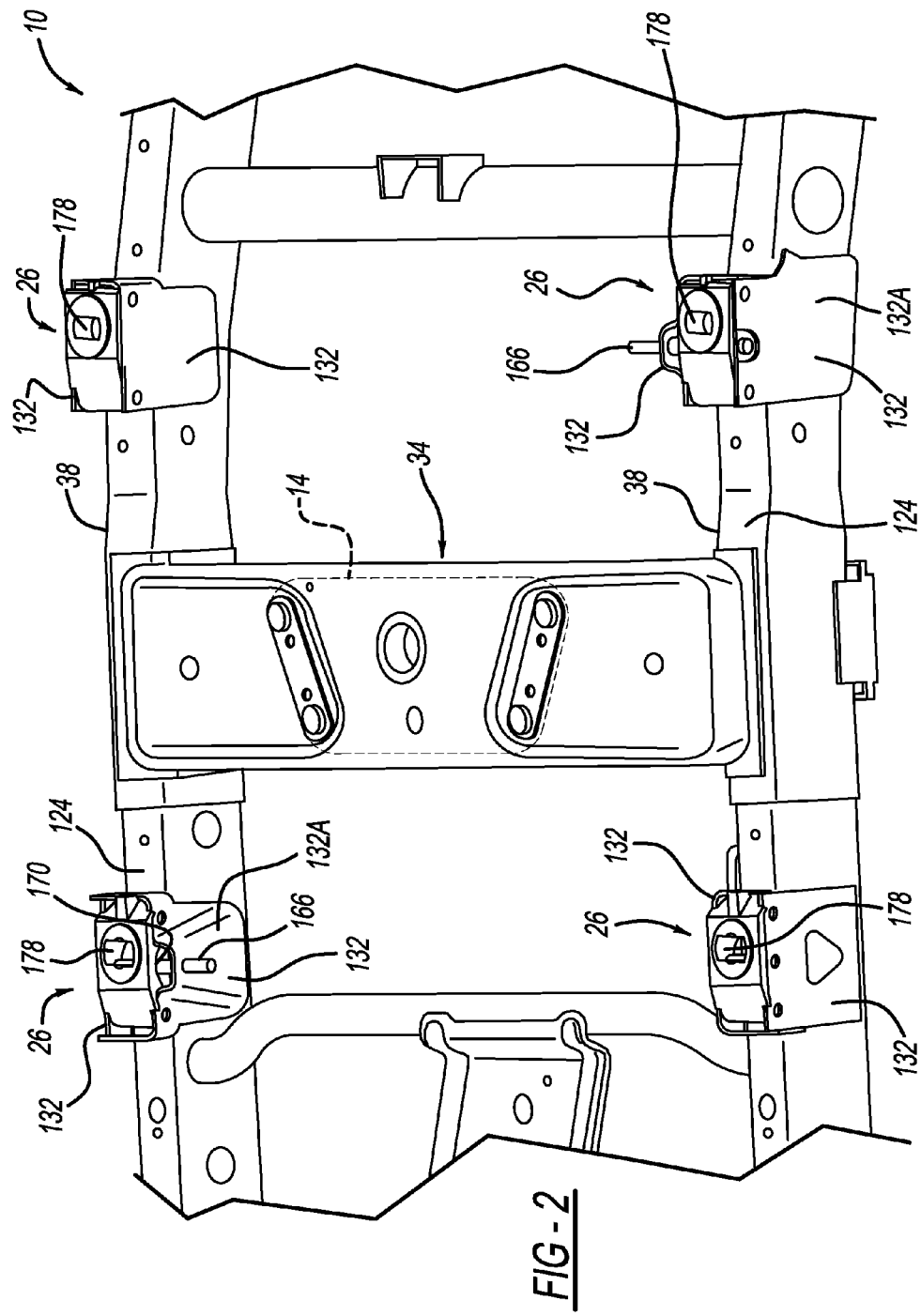
FIG. 2 is a perspective view of the underbed support structure assembly associated with a pickup truck vehicle according to the principles of the present disclosure.
Figure 3:
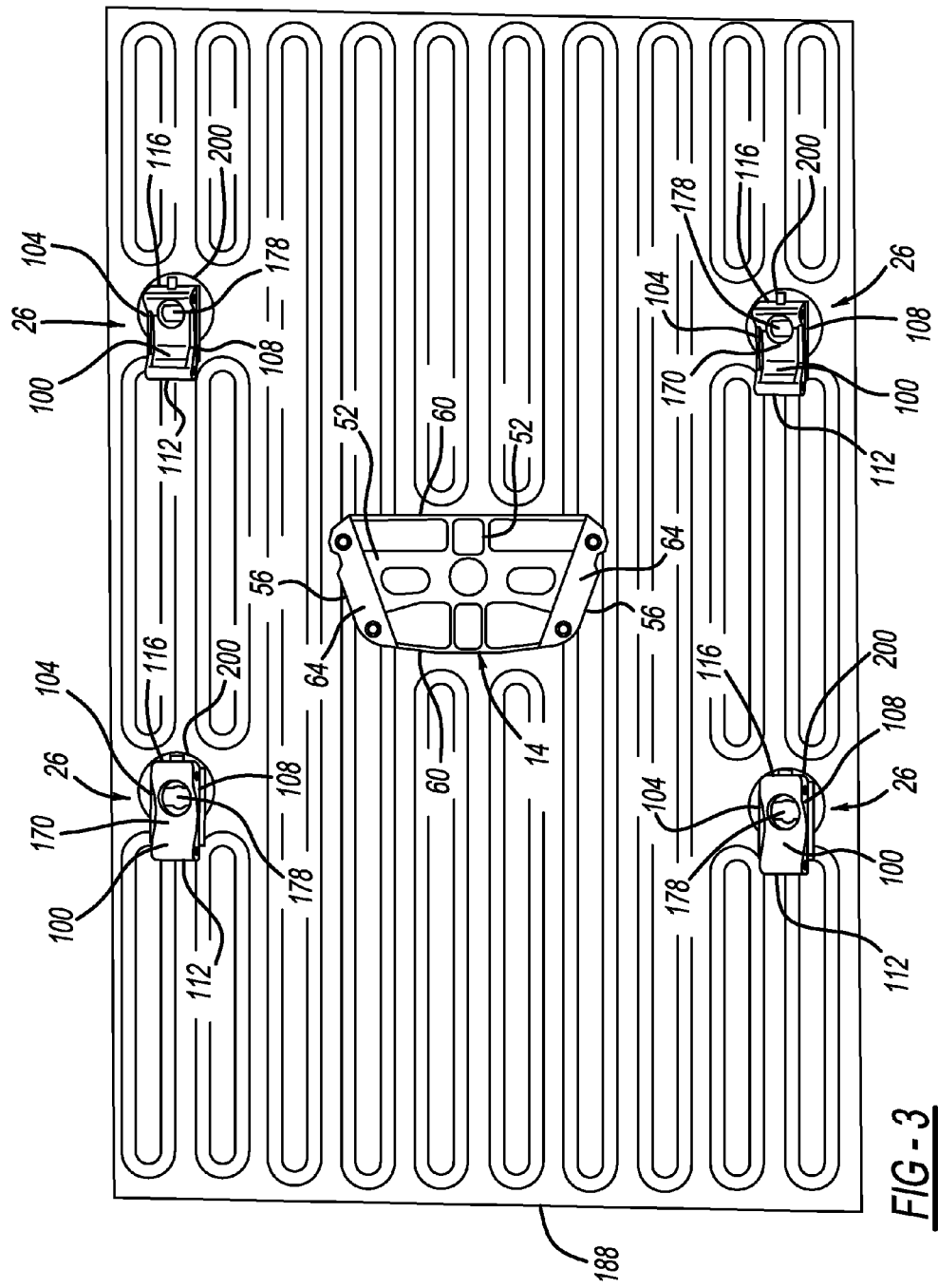
FIG. 3 is a bottom view of the components of the exemplary underbed support structure assembly of FIG. 1 shown in connection with an underside of a cargo bed load floor according to the principles of the present disclosure.
Figure 4:
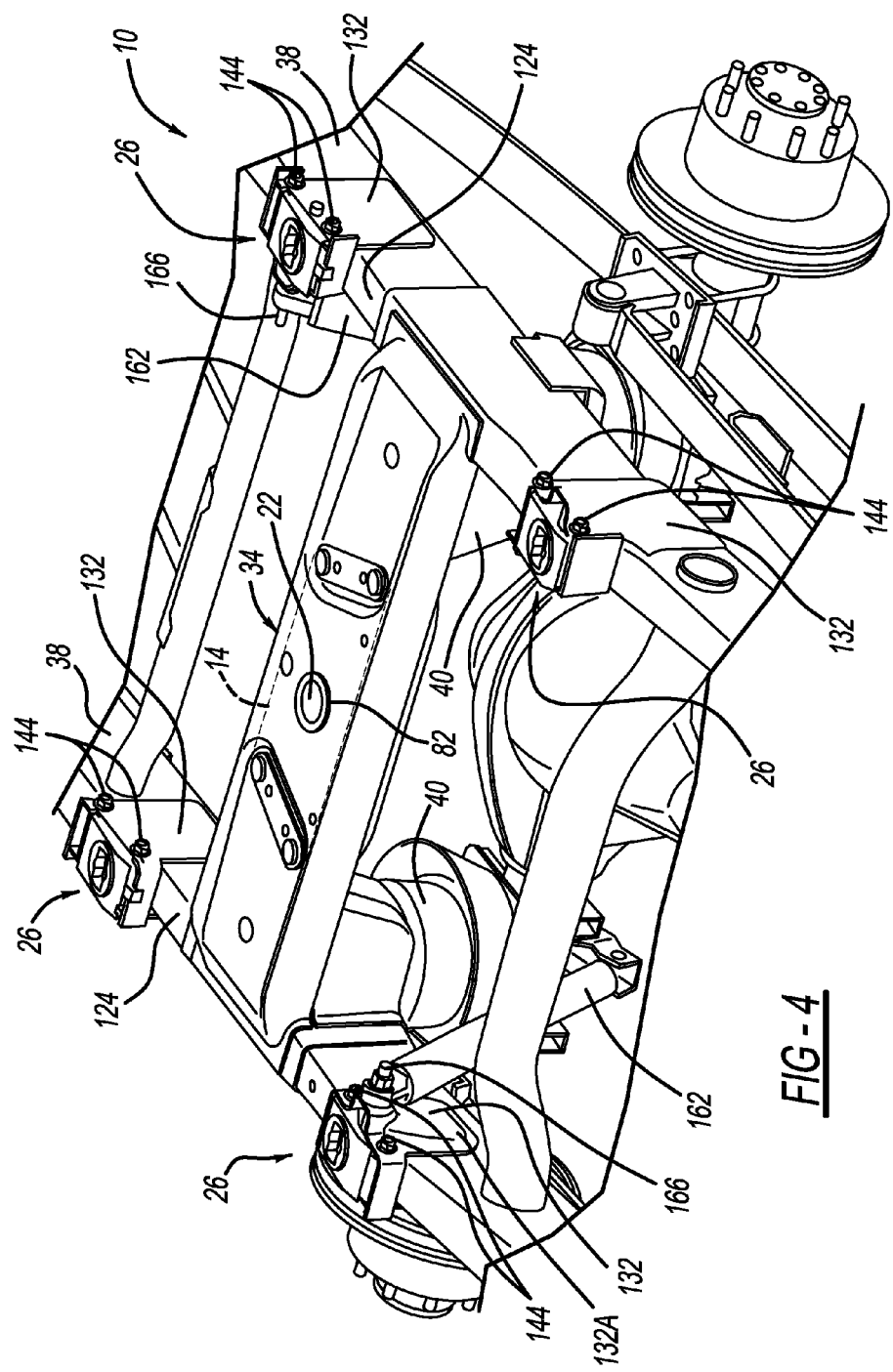
FIG. 4 is a perspective view of the exemplary underbed support structure assembly mounted to the vehicle along with associated suspension components according to the principles of the present disclosure.

With initial reference to FIGS. 1 and 2 of the drawings, an exemplary underbed support structure assembly is shown and generally identified at reference numeral 10. The underbed support structure assembly 10 can selectively accommodate either a fifth wheel hitch or a gooseneck hitch. As will be discussed in greater detail below, the underbed support structure assembly 10 can be positioned under a load floor of a cargo bed such that the support structure assembly 10 does not protrude into or interfere with use of the cargo bed load floor. The support structure assembly 10 can, in an exemplary implementation, take advantage of existing vehicle structural members so as to reduce a need for packaging one or more additional support structure frame members to support the gooseneck hitch. Reducing a need for such additional frame members can also reduce manufacturing cost and complexity associated with, for example, manufacturing different models of a pickup truck that will and will not receive the support structure assembly 10.

In this regard, the underbed support structure assembly 10 can position mounting pads over longitudinal frame rails of the vehicle without requiring additional cross-member structural supports. One or more of the mounting pads can be configured to selectively couple a fifth wheel hitch or safety chain attachments for a gooseneck hitch. In this example implementation, the mounting pads can be spaced apart from and separate from a suspension cross-member that is configured to also support a gooseneck ball receiver, as will also be discussed in greater detail below.

Figure 7:
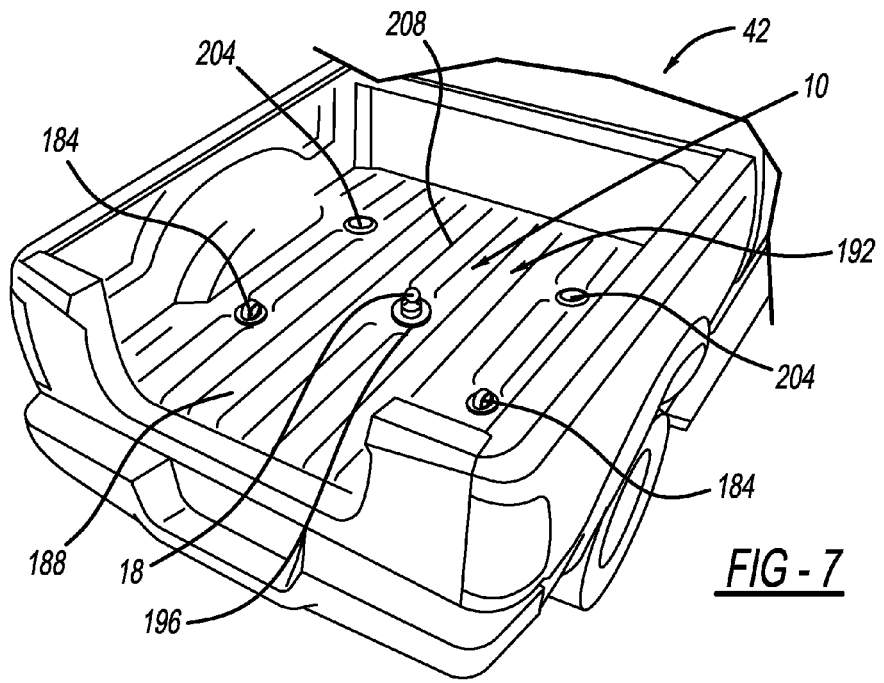
FIG. 7 is a perspective view of the cargo bed load floor of the pickup truck showing the underbed support structure assembly in relation thereto when a gooseneck trailer hitch and safety chain tie downs are mounted according to the principles of the present disclosure.
Figure 8:
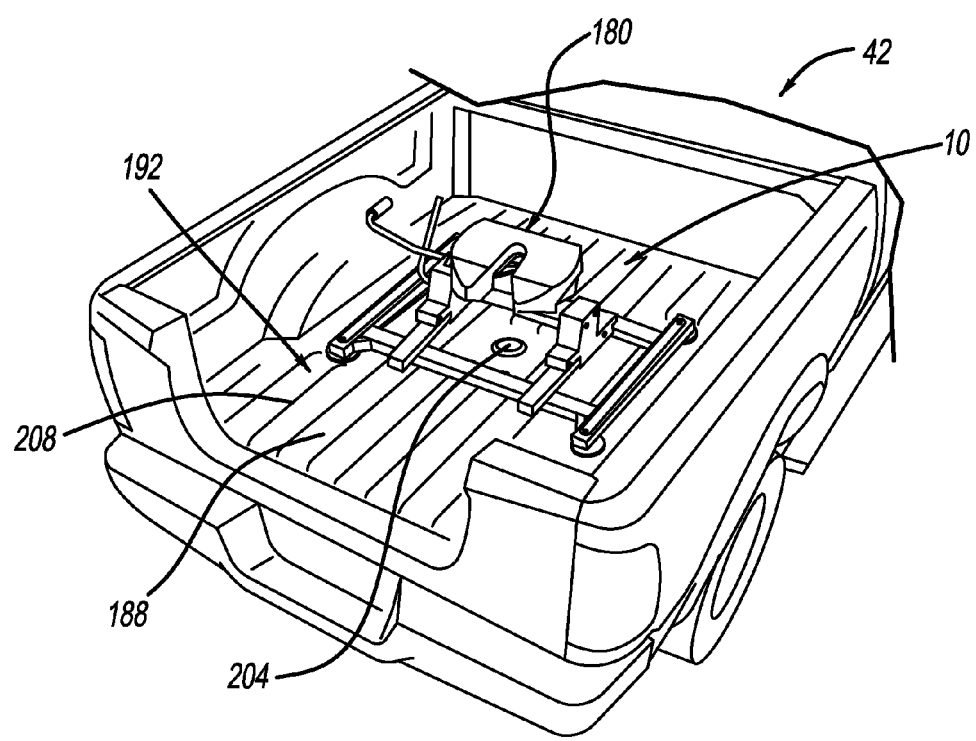
FIG. 8 is a perspective view of the cargo bed load floor of the pickup truck showing the underbed support structure assembly in relation thereto when a fifth wheel trailer hitch is mounted according to the principles of the present disclosure.

The underbed support structure assembly 10 can include, in the exemplary implementation illustrated, a structural gooseneck hitch receiving member 14 and four mounting pads 26. The structural gooseneck hitch receiving member 14 can define a receiving feature 22 for a gooseneck hitch/ball 18 (FIG. 7). As discussed above, the structural gooseneck hitch receiving member 14 can be coupled to an existing vehicle frame member, such as an air suspension cross-member 34. As shown, the air suspension cross-member 34 can extend between the longitudinal frame rails 38 of pickup truck or vehicle 42. The air suspension cross-member 34 can support air suspension components 40, as well as other suspension components including non-air suspension and vehicle components.

In the exemplary implementation illustrated, the structural gooseneck hitch receiving member 14 can be a structural casting 14 formed from steel or a steel alloy. Various other metals and metal alloys can also be used to form the structural casting 14, as may be desired depending on vehicle and application design considerations. While the structural gooseneck hitch receiving member will be referred to hereinafter as a structural casting 14, it should be appreciated that the structural hitch receiving member can be formed from various manufacturing methods, such as a stamping operation.

The structural casting 14, in the exemplary implementation illustrated, can include a larger width 44 than length 48 and can include a plurality of ribs 52 that extend from the gooseneck ball receiving feature 22 to lateral ends 56 or longitudinal ends 60. The lateral ends 56 can include a thicker or reinforced area 64 configured to receive fasteners to secure the structural casting 14 to the suspension cross-member 34. In one exemplary implementation, an upper surface 68 of the suspension cross-member 34 can include locating projections 72 configured to aid in assembling the structural casting 14 to the suspension cross-member 34.

The structural casting 14 can be mounted to a lower surface of the suspension cross-member 34 such that the upper surface 68 of the structural casting 14 faces and/or engages the lower surface. In this exemplary implementation, the suspension cross-member 34 is positioned over and covers or substantially covers the structural casting 14 when assembled in vehicle 42. The suspension cross-member 34 can include an aperture 82 configured to provide access through the cross-member 34 to the gooseneck ball receiving feature 22.

In the exemplary implementation illustrated, the structural casting 14 can include a lateral width 44 less than a width of the suspension cross-member 34 and a width between the longitudinal frame rails 38. It should be appreciated that the length 48 and width 44 of the structural casting 14 can vary depending on, for example, design and packaging criteria for particular vehicles and/or applications.

The gooseneck ball receiving feature 22 defined by structural casting 14 can be in the form of a socket or receptacle 88. In the exemplary implementation illustrated, the receptacle 88 can include a cylindrical or substantially cylindrical shape configured to mate with and be complimentary to a corresponding shape of a mating portion of gooseneck ball 18. It should be appreciated, however, that the receptacle 88 can include various different shapes as may be desired for different vehicle or design applications. In one exemplary configuration, the receptacle 88 can include a quick-connect receptacle 88 configured to removably receive a quick-connect gooseneck hitch/ball 18 through an access opening in the load floor and the aperture 82 in the suspension cross-member 34.

The mounting pads 26 can include a body 92 having an upper surface 96, an opposed lower surface 100, inner and outer sides 104, 108, a first end 112 and a second opposite end 116. It should be appreciated, however, that the mounting pads 26 can be formed from various different materials and/or manufacturing methods. It should also be appreciated that the mounting pads may also be referred to as pucks or a puck mounting system.

In the exemplary implementation illustrated, the four mounting pads 26 can be mounted directly over the longitudinal frame rails 38 such that they are in-line or substantially in-line with frame rails 38. In one exemplary implementation, the mounting pads 26 can be directly above the frame rails 38 such that the lower surface 100 of mounting pads 26 directly faces an upper surface 124 of frame rails 38. The mounting pads 26 can be mounted to the frame rails 38 with pairs of brackets 132. It should be appreciated that while the discussion will continue with reference to pairs of brackets 132, the pairs of brackets 132 can be provided in various forms, including a single bracket mounted to one side of the frame rails and/or a single bracket having two flanges for mounting to opposed sides of the frame rails 38. In the exemplary implementation illustrated, the pairs of brackets 132 can be coupled to opposed sides of the frame rails 38 and the inner and outer sides 104, 108 of mounting pads 26.

The mounting pad body 92 can define first and second through bores 140 proximate the first and second ends 112, 116 for receiving fasteners 144 to couple or secure mounting pads 26 to their respective brackets 132. Using fasteners provides an ability to individually service, remove and/or replace each of the mounting pads 26. In one exemplary implementation, the body 92 can also define or include an overhang or shoulder 152 on each side 104, 108 configured to engage an upper end 156 of the brackets 132. This arrangement can provide additional support for the mounting pads 26 beyond that provided by fasteners 144 when, for example, a fifth wheel hitch is removably mounted thereto. It should be appreciated that the mounting pads 26 can alternatively be coupled to the frame rails 38 using other securing arrangements, such as welding the mounting pads 26 to the brackets 132 and/or frame rails 38.

In the exemplary implementation illustrated in the various figures, two of the four pairs of brackets 132 (hereinafter referred to as brackets 132A) can be used for mounting suspension system components, such as rear shocks 162. In other words, two of the four pairs of brackets 132A are utilized by the vehicle 42 independent of the support structure assembly 10. Thus, the support structure assembly 10 advantageously leverages these two existing pairs of brackets 132A for the additional purpose of mounting two of the mounting pads 26.

Figure 5:
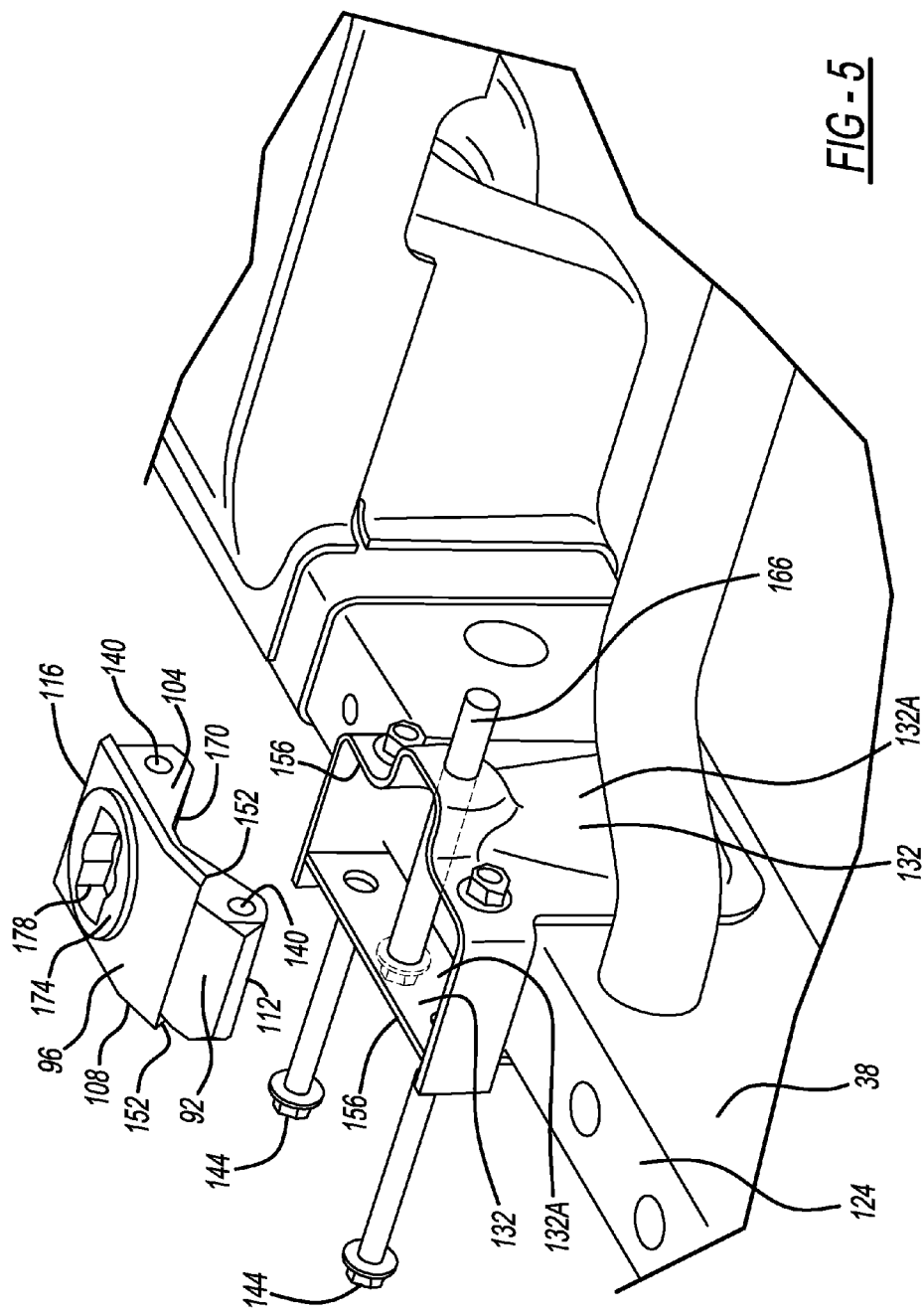
FIG. 5 is an exploded view of a mounting pad and bracket assembly of the underbed support structure assembly according to the principles of the present disclosure.
Figure 6:
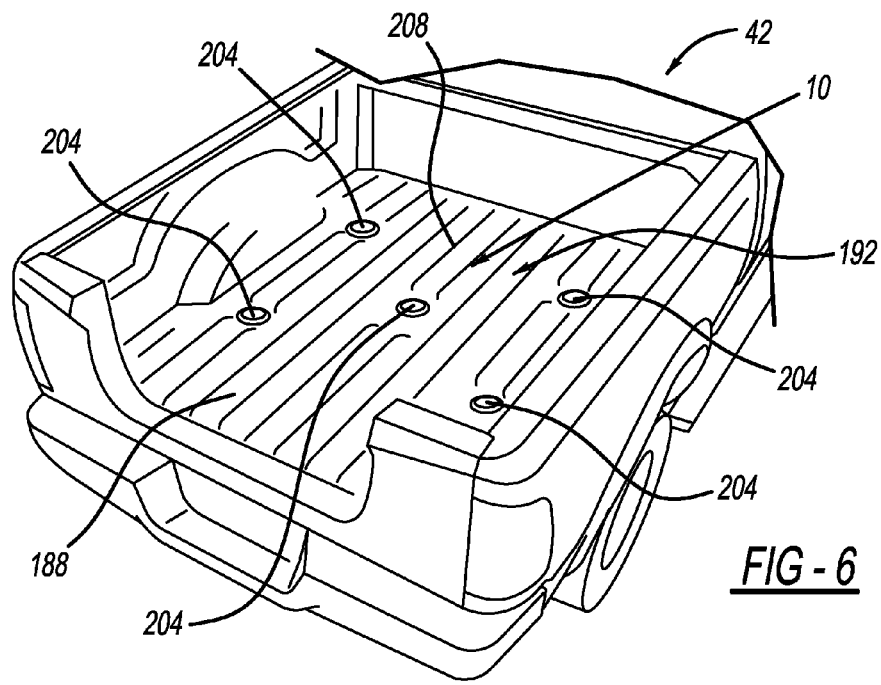
FIG. 6 is a perspective view of a cargo bed load floor of a pickup truck showing the underbed support structure assembly in relation thereto when the gooseneck trailer hitch and the fifth wheel trailer hitch are dismounted according to the principles of the present disclosure.

The two pairs of mounting brackets 132A that serve as shock mounts can receive a fastener 166 for coupling the rear shocks 162 to the vehicle 42. The lower surface of at least two of the four mounting pads 26 can include a cut-out or clearance area 170 configured to receive a portion of the fastener 166 therein when the mounting pads 26 are fastened to the respective pairs of brackets 132A, as can be seen in FIG. 5 with reference to FIG. 2. In the exemplary implementation illustrated, the two pairs of brackets 132A can be diagonally opposed about opposite sides of the suspension cross-member 34.

The body 92 of each of the mounting pads 26 can also define raised load surfaces 174 and a socket or receptacle 178 therethrough. The receptacle 178 can be configured to selectively receive either a fifth wheel attachment member, such as a locking pin, for securing a fifth wheel adaptor and/or hitch 180, or a tie down member 184 for securing gooseneck hitch safety chains (not specifically shown) to vehicle 42. In one exemplary implementation, the receptacle 178 can be a quick-connect receptacle configured to removably receive a quick-connect locking pin or a quick-connect tie down member 184.

As briefly discussed above, the underbed support structure assembly 10 can accommodate either a fifth wheel hitch 180 or a gooseneck hitch/ball 18 without requiring any modification or conversion. The load floor 188 of the pickup truck bed 192 can include an aperture 196 aligned with the gooseneck ball receiving receptacle 88 in structural casting 14, and four apertures 200 aligned with the load surfaces 174 and receptacles 178 of the respective mounting pads 26. In one exemplary implementation, the underbed support structure assembly 10 can be provided on a vehicle with only the fifth wheel mounting pads 26 and associated structure (e.g., mounting brackets 132) or only the gooseneck ball/hitch receiver structural casting 14. By providing the mounting pads 26 and associated structure independent of the structural casting 14 and air suspension cross-member 34, the gooseneck hitch receiving components and the fifth wheel hitch receiving components can be individually provided on the pickup truck 42, or provided as a combined package.

Removable caps or covers 204 can be positioned in apertures 196, 200 to cover the openings when not in use. One or more of the covers 204 can be selectively removed to provide access to the desired receptacles for mounting either the gooseneck hitch/ball 18 and tie down members 184, or the fifth wheel hitch 180. In one exemplary configuration, the load floor 188 of bed 192 can include a plurality of raised ribs 208 and a height of the covers can be less than or equal to or substantially equal to a height of the raised ribs 208 so as to not interfere with an item being placed on or along load floor 188.

The underbed support structure assembly 10 can selectively accommodate either a fifth wheel hitch 180 or a gooseneck hitch/ball 18 while not interfering with use of cargo bed 192 when the gooseneck hitch 18 and fifth wheel hitch 180 are dismounted. The underbed support structure assembly 10 can, in an exemplary implementation, take advantage of existing vehicle structural members (e.g., suspension cross-member and suspension mounting brackets) so as to reduce a need for packaging one or more additional frame members thereby reducing manufacturing cost and complexity.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An apparatus for attaching either a gooseneck trailer hitch or a fifth wheel trailer hitch to a truck bed, comprising:
a single cross-member attached to first and second truck longitudinal frame rails;
a gooseneck ball receiver coupled to the single cross-member and aligned with a gooseneck hitch opening in the truck bed; and
a plurality of mounting pads spaced apart from the single cross-member and attached to the frame rails independent of the single cross-member, the plurality of mounting pads aligned with a corresponding plurality of access openings in the truck bed;
wherein the single cross-member is a suspension cross-member supporting at least first and second suspension members; and
wherein the plurality of mounting pads are each individually mounted directly over the first or second longitudinal frame rails with a mounting bracket.

2. The apparatus of claim 1, wherein the suspension cross-member is an air suspension cross-member and the first and second suspension members are first and second air suspension members.

3. The apparatus of claim 1, wherein the plurality of mounting pads includes four mounting pads.

4. The apparatus of claim 1, wherein a first pair of the plurality of mounting pads are attached to the first longitudinal frame rail, and a second pair of the plurality of mounting pads are attached to the second longitudinal frame rail.

5. The apparatus of claim 4, wherein a first mounting bracket of one of the first pair of mounting pads and a second mounting bracket of one of the second pair of mounting pads each support a suspension component.

6. The apparatus of claim 5, wherein the suspension component is a shock.

7. The apparatus of claim 5, wherein the first mounting bracket is positioned forward of a rear axle and associated with one of the first and second longitudinal frame rails, and wherein the second mounting bracket is positioned rearward of the rear axle and associated with the other one of the first and second longitudinal frame rails.

8. The apparatus of claim 7, wherein the first mounting bracket and the second mounting bracket are each configured to receive a suspension fastener for supporting the suspension component.

9. The apparatus of claim 8, wherein the one of the first and second pairs of mounting pads associated with the first and second mounting brackets each include a top side and an opposed bottom side, and wherein the bottom side includes a cut-out to provide clearance for the suspension fastener.

10. The apparatus of claim 9, wherein the top side faces the truck bed and the bottom side faces a top side of the respective longitudinal frame rails.

11. The apparatus of claim 9, wherein each mounting pad of the first and second pairs of mounting pads includes first and second bores positioned proximate first and second opposed longitudinal ends thereof, the first and second bores configured to receive mounting fasteners to attach each mounting pad to its respective mounting bracket.

12. The apparatus of claim 11, wherein the first and second bores are on opposed longitudinal sides of the cut-outs of the one of the first and the one of the second pairs of mounting pads.

13. The apparatus of claim 11, wherein the mounting pads of the first and second pairs of mounting pads are mounted directly over the respective first and second longitudinal frame rails such that the mounting pads are longitudinally aligned with the respective first and second longitudinal frame rails.

14. The apparatus of claim 1, wherein the single cross-member attached to first and second truck longitudinal frame rails includes only the single cross-member attached to the first and second longitudinal frame rails, the single cross-member being an air suspension cross-member supporting at least first and second air suspension members.

15. An apparatus for attaching either a gooseneck trailer hitch or a fifth wheel trailer hitch to a truck bed, comprising:

a single cross-member attached to first and second truck longitudinal frame rails, the single cross-member supporting first and second suspension components;

a gooseneck ball receiver coupled to the single cross-member and aligned with a gooseneck hitch opening in the truck bed; and a first and a second pair of mounting pads spaced apart from the single cross-member and attached to the respective first and second frame rails independent of the single cross-member and each other, the first and second pairs of mounting pads aligned with a corresponding first and second pair of access openings in the truck bed;

wherein a first mounting bracket associated with one of the first pair of mounting pads and a second mounting bracket associated with one of the second pair of mounting pads support respective third and fourth shock members.

16. The apparatus of claim 15, wherein the first pair of mounting pads are attached directly over the first longitudinal frame rail, and the second pair of mounting pads are attached directly over the second longitudinal frame rail, and wherein the first mounting bracket and associated mounting pad are positioned forward of a rear axle and the second mounting bracket and associated mounting pad are positioned rearward of the rear axle.

17. The apparatus of claim 16, wherein the first mounting bracket and the second mounting bracket are each configured to receive a suspension fastener for supporting the respective shock member, and wherein the one of the first and second pairs of mounting pads associated with the first and second mounting brackets each include a top side facing the truck bed and an opposed bottom side facing a top side of the frame rail, the bottom side including a cut-out to provide clearance for the suspension fastener.

18. The apparatus of claim 17, wherein each mounting pad of the first and second pairs of mounting pads includes first and second bores positioned proximate first and second opposed longitudinal ends thereof, the first and second bores configured to receive mounting fasteners to attach each mounting pad to its respective mounting bracket, and wherein the first and second bores are on opposed longitudinal sides of the cut-outs of the one of the first and second pairs of mounting pads.

\* \* \* \* \*